United States Patent
Yoshida et al.

(10) Patent No.: US 7,014,278 B2
(45) Date of Patent: Mar. 21, 2006

(54) DRIVE ASSEMBLY FOR A TRACK-TYPE VEHICLE

(75) Inventors: Tsuyoshi Yoshida, Osaka (JP); Kazushi Nakata, Osaka (JP); Shouta Murakami, Osaka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 11/052,096

(22) Filed: Feb. 8, 2005

(65) Prior Publication Data

US 2005/0206238 A1   Sep. 22, 2005

Related U.S. Application Data (63) Continuation-in-part of application No. 10/774,394, filed on Feb. 10, 2004.

(51) Int. Cl.
   *B62D 55/108* (2006.01)

(52) U.S. Cl. .................. 305/132; 305/124; 180/9.54

(58) Field of Classification Search ............. 305/124, 305/125, 129, 130, 132, 133, 142; 180/9.1, 180/9.54
   See application file for complete search history.

(56) References Cited

U.S. PATENT DOCUMENTS

| | | | |
|---|---|---|---|
| 758,757 A * | 5/1904 | Jones ..................... 180/9.44 |
| 2,051,864 A | 8/1936 | Knox et al. |
| 2,093,456 A | 9/1937 | Knox |
| 2,982,351 A | 5/1961 | Scott |
| 3,082,043 A | 3/1963 | Orton |
| 3,216,520 A | 11/1965 | Blonsky |
| 3,601,454 A | 8/1971 | Reinsma |
| 3,787,097 A | 1/1974 | Orr |
| 3,826,325 A | 7/1974 | Purcell et al. |
| 4,082,371 A | 4/1978 | Werner et al. |
| 4,351,572 A | 9/1982 | Fujiwara et al. |
| 4,361,363 A * | 11/1982 | Livesay ..................... 305/125 |
| 4,391,341 A | 7/1983 | Taghon |
| 4,519,654 A | 5/1985 | Satzler et al. |
| 4,553,790 A | 11/1985 | Boggs |
| 4,582,367 A | 4/1986 | Jacquet et al. |
| 4,583,791 A | 4/1986 | Nagata et al. |
| 4,681,177 A | 7/1987 | Zborowski |
| 4,744,431 A | 5/1988 | Stollinger |
| 4,881,786 A | 11/1989 | Tonsor |
| 5,749,423 A | 5/1998 | Burckhartzmeyer et al. |
| 6,607,256 B1 | 8/2003 | Yoshida et al. |
| 6,705,406 B1 * | 3/2004 | Das et al. ................... 166/381 |

FOREIGN PATENT DOCUMENTS

| | | | |
|---|---|---|---|
| JP | 2-102883 | * | 4/1990 |
| JP | 5-319325 | * | 12/1993 |

* cited by examiner

*Primary Examiner*—Russell D. Stormer
(74) *Attorney, Agent, or Firm*—Posz Law Group, PLC; R. Eugene Varndell, Jr.

(57) ABSTRACT

A drive assembly has a track frame, an idler, and a sprocket arranged substantially on a straight line that includes single track roller units disposed respectively closest to the idler and closest to the sprocket. The single track roller units each rotatably support a track roller at an end of an arm that is rockably attached at another end to the track frame. The single track roller units bear the vehicle body load at the distal end of the arm through elastic members. A double track roller unit is interposed between the single track roller units, and includes a first arm rockably attached at its end to the track frame and a second arm rockably attached at its central portion to another end of the first arm. The second arm rotatably supports paired front and rear track rollers at two ends thereof.

12 Claims, 8 Drawing Sheets

DRIVE ASSEMBLY FOR A TRACK-TYPE VEHICLE

Cross-Reference to Related Application

This application is a continuation-in-part application of U.S. Ser. No. 10/774,394 filed on Feb. 10, 2004, now pending.

BACKGROUND OF THE INVENTION

1. Field of the Invention

The present invention relates to a drive assembly for a track-type vehicle.

2. Background Art

Figure 7:
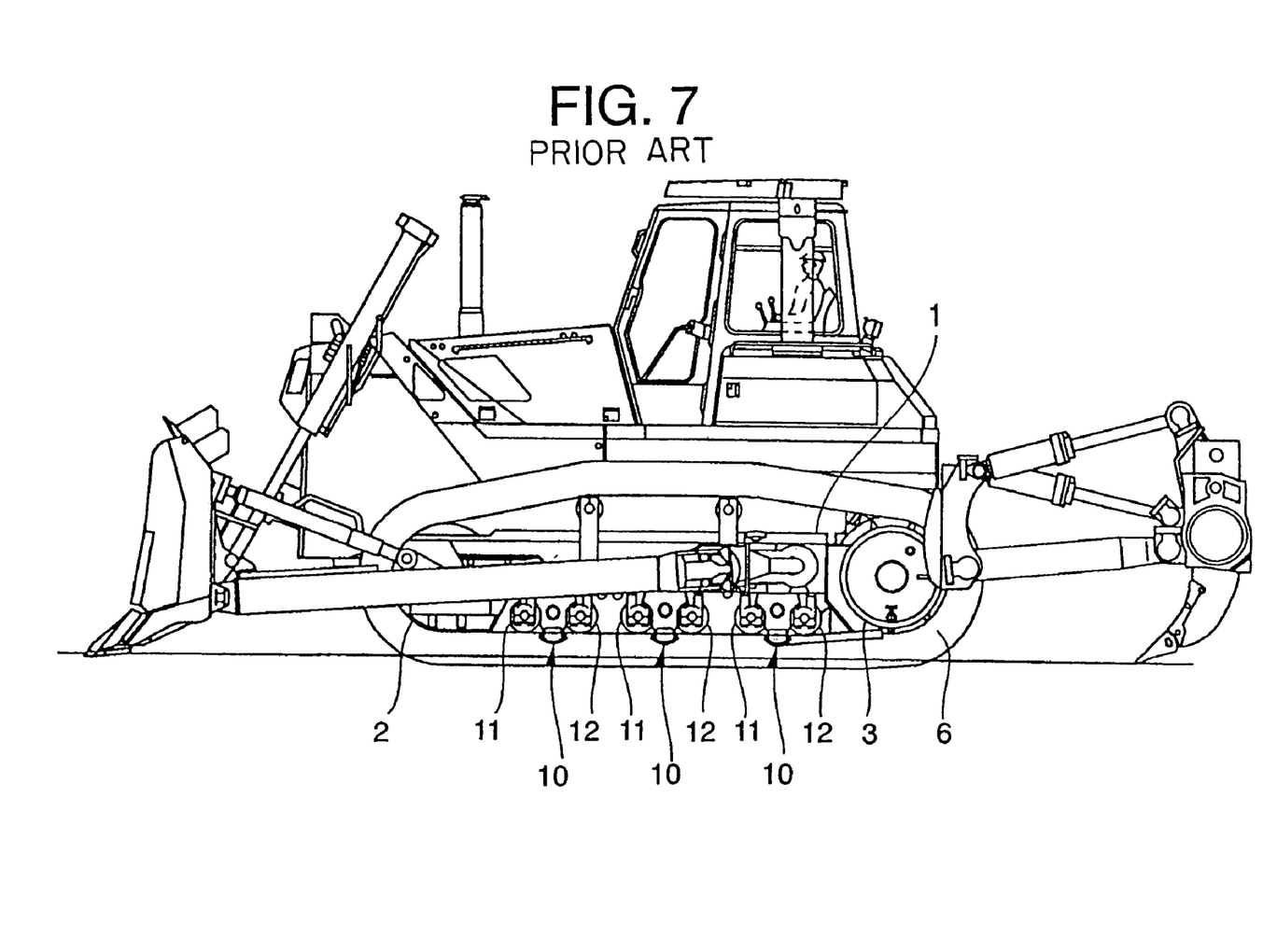
FIG. 7 is a side elevation of a bulldozer according to the related art.

One drive assembly used in the related art for a track-type vehicle is provided with bogie (or rocking type) track rollers for improving the riding comfortableness at the running time of the vehicle (as referred to in FIG. 1 to FIG. 5 of U.S. Pat. No. 6,607,256. FIG. 7 is a side elevation of a bulldozer as the track-type vehicle disclosed in U.S. Pat. No. 6,607,256, and FIG. 8 is a side elevation of a drive assembly of the track-type vehicle.

Figure 8:
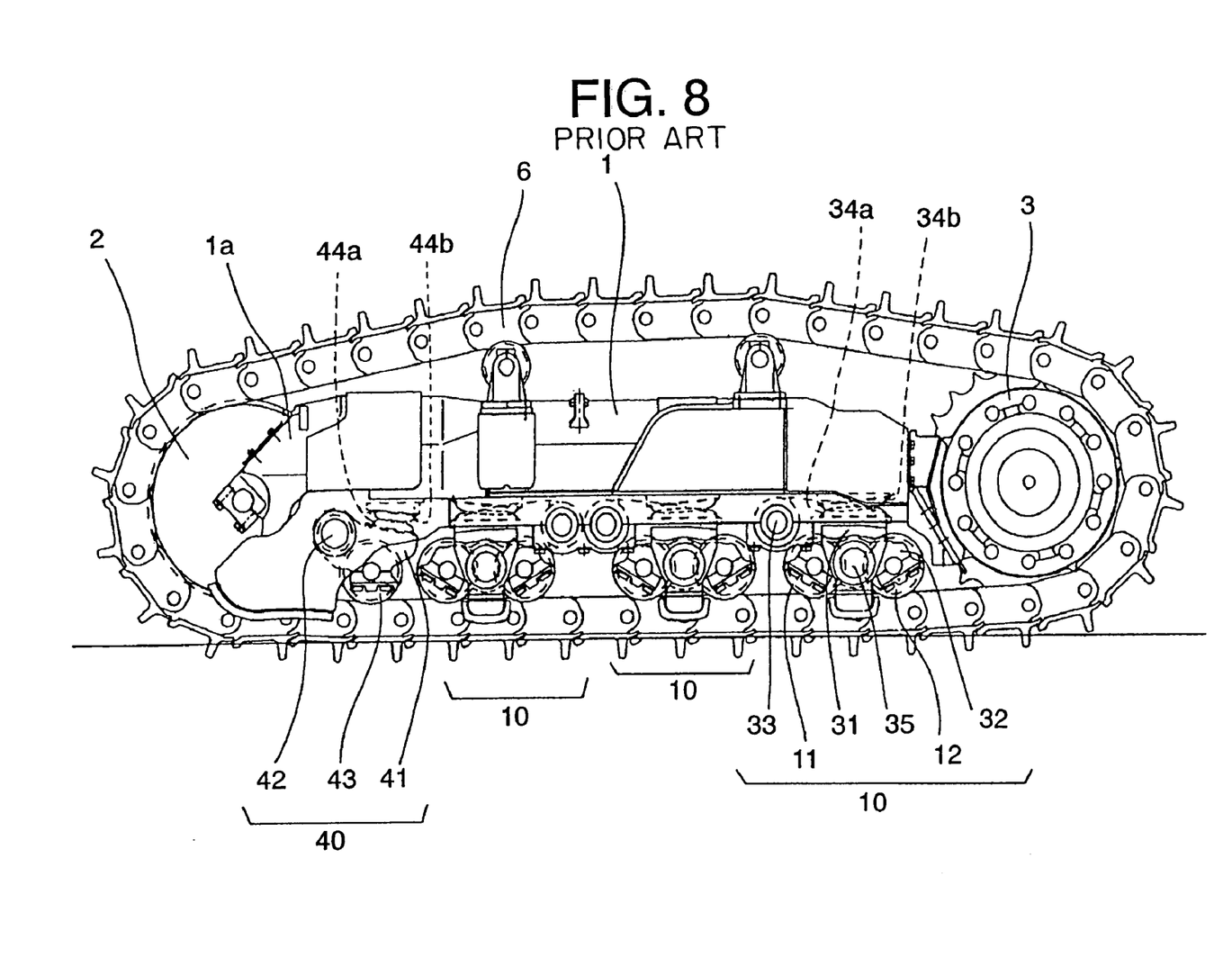
FIG. 8 is a side elevation of a drive assembly according to the related art.

In FIGS. 7 and 8, the track-type vehicle is provided with a drive assembly having crawlers 6 below the right-hand and left-hand sides of its body. The drive assembly is provided with a pair of track frames 1 and each track frame 1 is arranged along a longitudinal direction of the vehicle. Further, the an idler 2 and a sprocket 3 are disposed at a front end portion and a rear portion of the track frame 1, respectively. Below the track frame 1 and at a position closest to the idler 2, there are provided a single track roller unit 40 having an arm 41 whose proximal end portion is attached to the track frame 1 via a pin 42 so as to vertically rock and a track roller 43 rotatably mounted on a distal end portion of the arm 41.

Below the track frame 1 and between the single track roller unit 40 and the sprocket 3, there is provided a double track roller unit 10 comprising a first arm 31 whose proximal end portion is attached to the track frame 1 via a first pin 33 so as to vertically rock, a second arm 32 whose central portion is attached to a distal end portion of the first arm 31 via a second pin 35 so as to vertically rock and a pair of longitudinal track rollers 11 and 12 which are rotatably mounted at two end portions of the second arm 32.

On an abutment portion between the distal end portion of the arm 41 of the single track roller unit 40 and a lower portion of the track frame 1 and at an abutment portion between an upper portion of the distal end portion of the first arm 31 of the double track roller unit 10 and the lower portion of the track frame 1, respectively, there are mounted elastic members 44a and 44b, and 34a and 34b, which have predetermined moduli of elasticity. Loads to be applied to the track roller 43 of the single track roller unit 40 and to the track rollers 11 and 12 of the double track roller unit 10 are respectively borne by upper and lower elastic members 44a and 44b, and 34a and 34b through the arm 41, and the second arm 32 and the first arm 31.

Here in the drive assembly for the track-type vehicle according to the related art described above, a position for the track roller to support a vehicle load is located at the elastic members 44a and 44b in the single track roller unit 40 and is substantially identical to a position of the track roller 43. In the double track roller unit 10, on the contrary, a support position is located at that of the elastic members 34a and 34b and is substantially identical to a center position between the paired front and rear track rollers 11 and 12.

Usually in the track-type drive assembly, a distance between the track rollers on longitudinally outermost sides for supporting the vehicle load is called an "effective ground contact length", by which a stability at a vehicle running time is retained. Therefore, the effective ground contact length of a running device of the related art is a distance between the track roller 43 of the single track roller unit 40, as located closest to the idler 2, and a center position between the front and rear track rollers 11 and 12 of the double track roller unit 10 located closest to the sprocket 3, so that the length is substantially shorter than the distance between the outermost track rollers.

Merely in order to enlarge the effective ground contact length, generally speaking, it is naturally sufficient to elongate the distance (which will be called a "tumbler distance", as usually called so) between the idler and the sprocket thereby to elongate the distance between the outermost track rollers accordingly. With this modification, however, the track frame 1 is large-sized, and the running length of a crawler 6 is enlarged to raise a cost. Therefore, it has been desired to make a best use of a space within the tumbler distance thereby to make the effective ground contact length as large as possible without elongating the tumbler distance.

SUMMARY OF THE INVENTION

The present invention has been conceived to solve the problems of the related art and has an object to provide a drive assembly for a track-type vehicle, which can make the best use of the space within the tumbler distance thereby to make the effective ground contact length within the tumbler distance as large as possible.

According to an embodiment of the invention, there is provided a drive assembly for a track-type vehicle having a track frame, an idler and a sprocket arranged substantially on a straight line, a plurality of track rollers disposed rotatably below the track frame, and a crawler made to run around the idler, the track rollers and the sprocket, the drive assembly comprising single track roller units disposed at portions closest to the idler and the sprocket respectively, each single track roller unit having an arm whose proximal end portion is attached to the track frame so as to rock, a track roller rotatably supported at a distal end portion of the arm, and an elastic member disposed between the arm and the track frame in a rotating direction of the arm and a double track roller unit interposed between the single track roller units having a first arm whose proximal end portion is attached to the track frame so as to rock, a second arm whose central portion is attached to a distal end portion of the first arm, and a pair of front and rear track rollers rotatably supported on both distal ends of the second arm, wherein a pair of track frames are disposed on right and left sides of the track-type vehicle, each track frame having both single-track roller units and the double track roller unit, and a vehicle body load is borne via the elastic member.

According to this construction, the track roller closest to the idler and the track roller closest to the sprocket are supported at arm distal end portions of the single track roller units so that the vehicle body load is borne by the arm distal end portions via the elastic members. In addition, since a horizontal distance between those two track rollers of the single track roller units is an effective ground contact length, a space within a tumbler distance can be exploited to the maximum thereby to enlarge the effective ground contact length. As a result, it is possible to improve a running stability of the vehicle and to enable a bulldozer to improve a ground leveling operation with a push of its blade thereby to realize a riding comfortableness with bogie type track rollers.

Alternately, an elastic member may be disposed between the first arm and the track frame in a rocking direction of the first arm of the double track roller unit so that the first arm can bear the vehicle body load via the elastic member.

According to this construction, the vehicle body load can be dispersed to and borne by the arms of the single track roller units and first arm of the double track roller units via the elastic members. As a result, the vehicle body loads applied to the track rollers supported by the arms and the track roller supported by the second arm are dispersed to each track roller thereby to maintain the riding comfortablness of the track-type vehicle.

Rocking fulcrums of the arms of the single track roller units and a rocking fulcrum of the first arm of the double track roller unit may be disposed closer to the idler than the distal end portions of the arms and the first arm. According to this construction, the rocking fulcrums of the arms of the single track roller units and the rocking fulcrum of the first arm of the double track roller unit or rocking fulcrums of first arms of all double track roller units are disposed closer to the idler than the distal end portions of the arms and the first arm(s).

Therefore, only one pin to act as the rocking fulcrum of the first arm of the double track roller unit is arranged between the track rollers of adjoining track roller units so that the distance between the track roller units can be shortened. As a result, the track rollers can be arranged in a compact manner within the tumbler distance thereby to improve the riding comfortableness at a running time.

According to positions, at which the loads are applied to the paired front and rear track rollers of the double track roller unit, apparent moduli of elasticity of the elastic members of the double track roller unit are differently distributed in such a manner that they gradually decrease from the track roller close to the rocking fulcrum (or close to the idler) of the first arm of the double track roller unit to the distal end portion of the first arm and to the track roller on the sprocket side.

On the other hand, the rocking fulcrums of the first arms of all the double track roller units are arranged close to the idler. Therefore, the rocking fulcrums having large apparent elastic modulus of the double track roller units are not close to each other so that a distribution of the apparent elastic modulus of a running device is substantially homogenized within the tumbler distance. Therefore, the elastic modulus of an entire running device is homogeneously distributed so that the vehicle can be prevented from becoming vibratory in a longitudinal direction when it runs on undulations thereby to retain the running stability.

Alternately, the arm whose proximal end portion is closest to the idler supports the track roller on one distal end thereof and rotatably supports the idler on the other end thereof. According to this construction, the idler and the track roller can be vertically rocked in a balance structure via the arm. In addition, since a position of the rocking fulcrum of the arm can be made closer to the idler, it is possible to locate a position of the track roller supported by one end portion of the arm to be closer to the idler. As a result, the effective ground contact length can be elongated.

Furthermore, the idler forms the balance structure with the single track roller unit and can vertically move. Due to this construction, an impact caused when the idler contacts an obstacle during a running time can be absorbed and thus, a vertical movement of the vehicle can be suppressed.

Alternately, three double track roller units may be interposed between the single track roller units so that eight track rollers are disposed in each track frame. According to this construction, a distance between the single track roller units can be exploited effectively to dispose the double track roller units and the vehicle body load of the track-type vehicle can be dispersed in a substantially homogeneous way. As a result, the riding comfortableness of the track-type vehicle at a running time can be maintained.

BEST MODE FOR CARRYING OUT THE INVENTION

The drive assembly of a track-type vehicle according to the invention will be described in detail in connection with its preferred embodiments with reference to the accompanying drawings. The embodiments will be described by exemplifying the track-type vehicle in a bulldozer.

Figure 1:
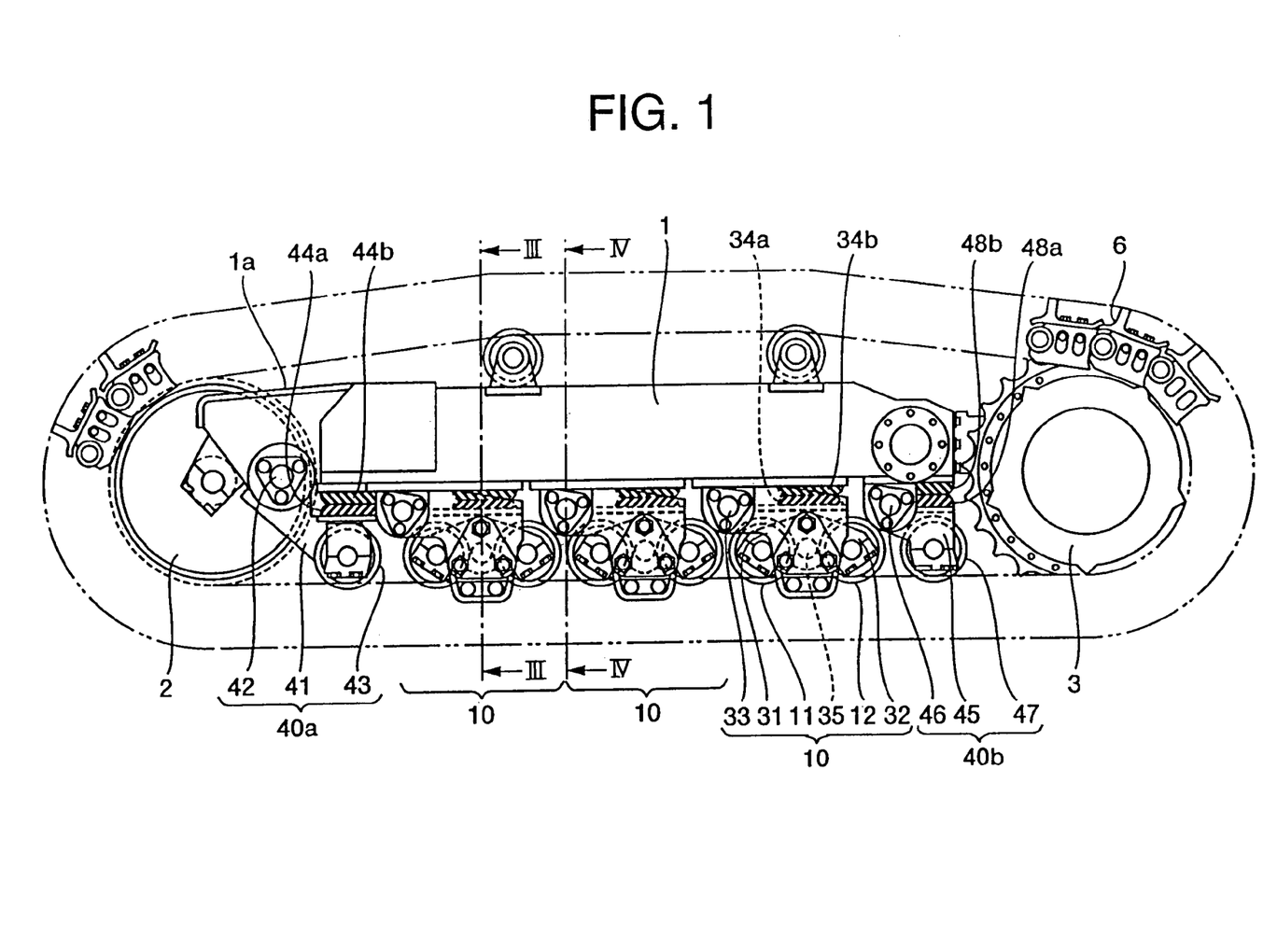
FIG. 1 is a side elevation of a drive assembly according to a first embodiment of the present invention.

The drive assembly according to the first embodiment will be described with reference to FIG. 1 to FIG. 5. In FIG. 1, a track frame 1 is provided at its one end portion with a yoke 1a, which can move in longitudinal directions (of a vehicle) but is tensed outward in a predetermined extent through a (not-shown) spring. An idler 2 is rotatably attached to a distal end portion of the yoke 1a.

A sprocket 3 is rotatably mounted on a (not-shown) vehicle body near the other end portion of the track frame 1. A plurality of track rollers 11, 12, 43, 47 and so on are attached in individually rocking manners to a lower portion of the track frame 1 between the idler 2 and the sprocket 3. A crawler 6 is made to run around the idler 2, the sprocket 3 and the track rollers 11, 12, 43 and 47.

The track frame 1 is supported individually at its front and back by an equalizer and a pivot pin (although both are not shown) mounted on the vehicle body. A pair of track frames 1 are disposed on right and left sides of the vehicle. FIG. 1 shows one of the track frames 1 and the other track frame 1 has a same construction as shown in FIG. 1.

A detailed description will be made in the following. Below the track frame 1 at a position closest to the idler 2, there is disposed a single track roller unit 40a. This single track roller unit 40a has an arm 41 whose proximal end portion is attached to a lower portion of the track frame 1 via a pin 42 so as to vertically rock. A track roller 43 is rotatably mounted on a lower portion of a distal end portion of the arm 41.

The pin 42 is disposed closer to the idler 2 than the track roller 43. On abutment portions of an upper portion of the distal end portion of the arm 41 and the lower portion of the track frame 1, there are mounted elastic members 44a and 44b respectively. These elastic members 44a and 44b abut against each other to restrict an upward turn of the arm 41 and to bear a load to be applied to the track roller 43 thereby to absorb an impact, which might otherwise be received by the track roller 43.

Below the track frame 1 at a position closest to the sprocket 3, there is disposed a single track roller unit 40b. This single track roller unit 40b has an arm 45 whose proximal end portion is attached to a lower portion of the track frame 1 via a pin 46 so as to vertically rock. The track roller 47 is rotatably mounted on a lower portion of a distal end portion of the arm 45.

The pin 46 is disposed at a position closer to the idler 2 than the track roller 47. On abutment portions of an upper portion of a distal end portion of the arm 45 and the lower portion of the track frame 1, there are mounted elastic members 48a and 48b respectively. These elastic members 48a and 48b abut against each other to restrict an upward turn of the arm 45 and to bear a load to be applied to the track roller 47 thereby to absorb an impact, which might otherwise be received by the track roller 47.

Figure 2:
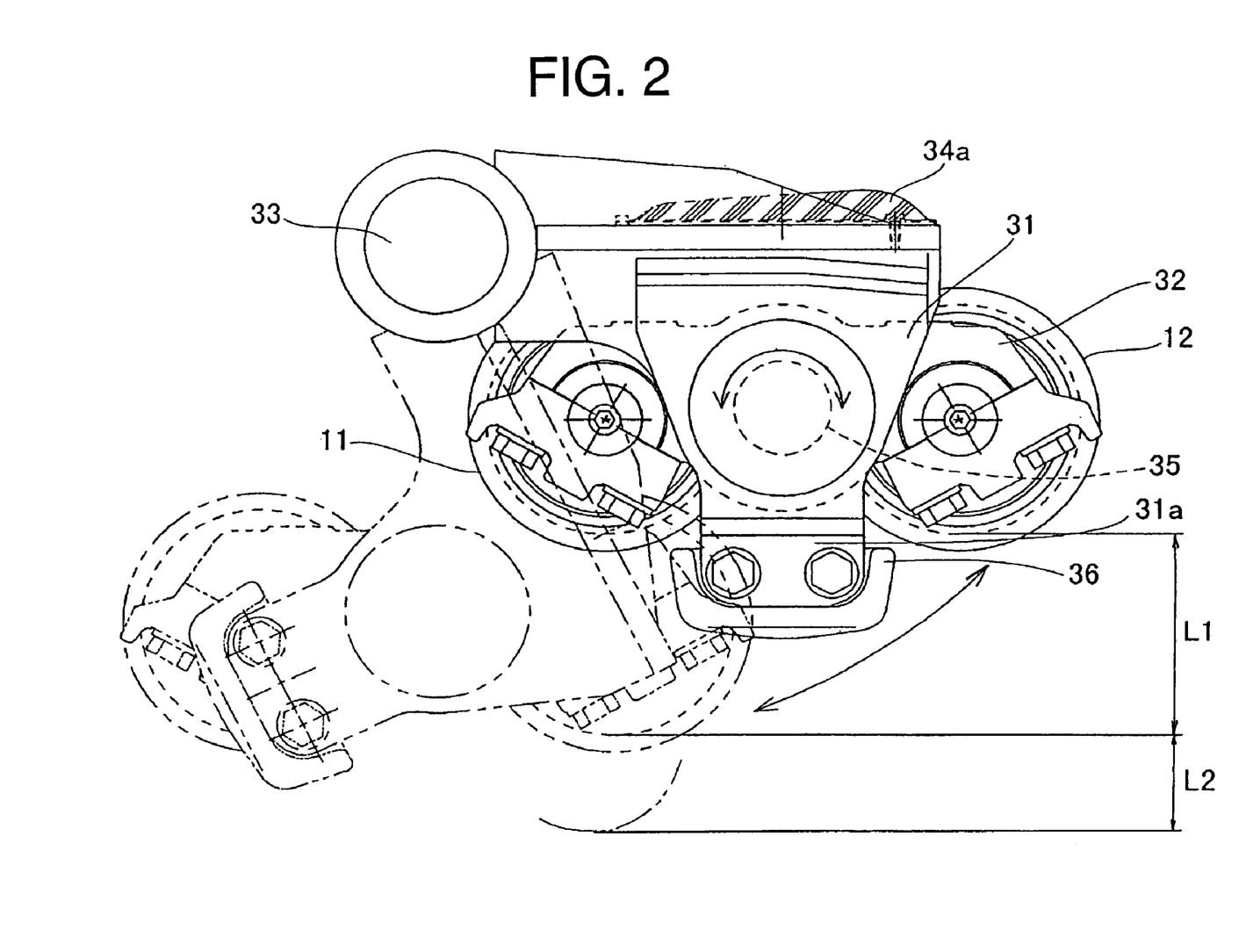
FIG. 2 is a detailed side elevation of a double track roller unit of the first embodiment.

Moreover, a predetermined number of double track roller units 10 are disposed below the track frame 1 and between the track roller 43 on a side of the idler 2 and the track roller 47 on a side of the sprocket 3. In the embodiments shown in the drawings, three double track roller units 10 are disposed. FIG. 2 is a detailed side section of a double track roller unit 10.

In FIG. 2, a first arm 31 is provided in such a manner that its proximal end is attached to a lower portion of the track frame 1 via a first pin 33 so as to vertically rock, and a second arm 32 is provided in such a manner that its substantial central portion is attached to a distal end of the first arm 31 via a second pin 35 so as to vertically rock. Track rollers 11 and 12 are rotatably attached individually to two end portions of the second arm 32. Here, the first pin 33 is disposed at a position closer to the idler 2 than the second pin 35.

On abutment portions of an upper portion of a distal end portion of the first arm 31 and a lower portion of the track frame 1, there are mounted elastic members 34a and 34b respectively. These elastic members 34a and 34b abut against each other to restrict an upward turn of the first arm 31 and to bear a load to be applied to the track rollers 11 and 12, which might otherwise be received by the track rollers 11 and 12. Furthermore, the elastic member 34a and 24b absorb an impact when the vehicle runs on or over an undulating portion, which might otherwise be received by the track rollers 11 and 12. The elastic members 34a, 34b, 48a and 48b can be made of natural rubber, urethane rubber or the like.

Figure 3:
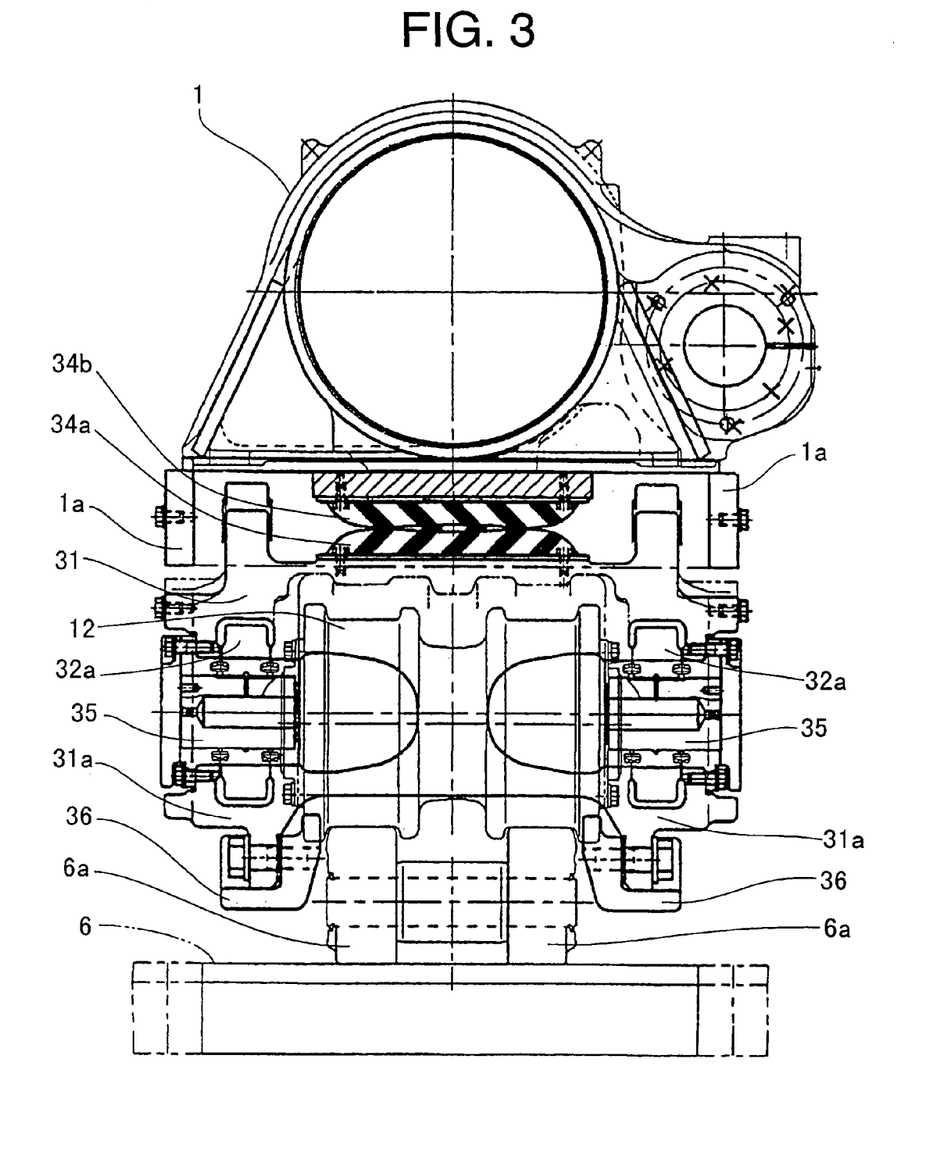
FIG. 3 is a sectional view taken along line III—III of FIG. 1.
Figure 4:
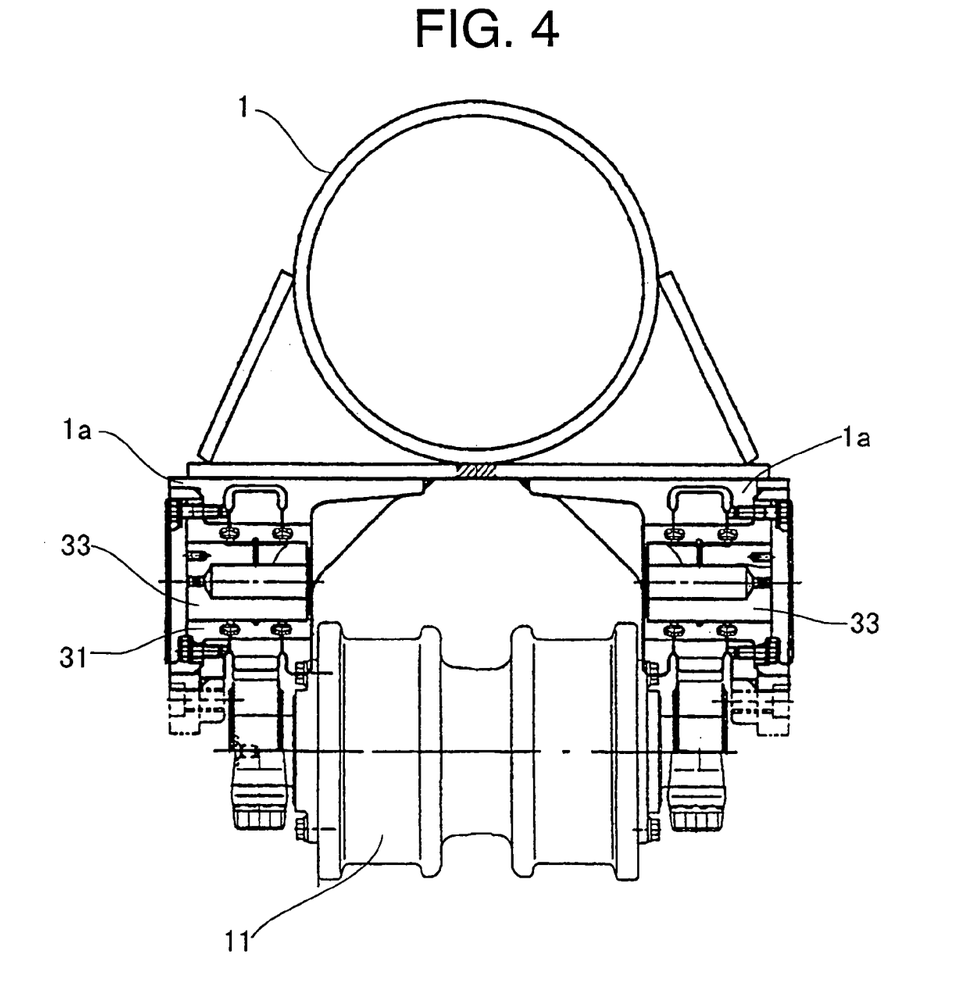
FIG. 4 is a sectional view taken along line IV—IV of FIG. 1.

Here will be described a detailed construction of the double track roller unit 10 with reference to FIGS. 3 and 4. Below the track frame 1 and on two transverse end portions of the vehicle, there are disposed a pair of plates 1a and 1a extending downward. The proximal end portions of the first arm 31 are mounted between the pair of plates 1a and 1a via right and left first pins 33, 33 so as to rock. The distal end portions of the first arm 31 are opened downward into such a U-shape in a transverse section as is provided at its transverse end portions with a pair of transverse support portions 31a and 31a extending downward.

Likewise, the second arm 32 is provided with a pair of transverse arm members 32a and 32a. Between the paired transverse support portions 31a and 31a, there are fitted the paired transverse arm members 32a and 32a, which are rockably mounted at their central portions on the second pins 35 and 35. The track rollers 11 and 12 are rotatably mounted individually at two distal end portions of the second arm 32 and between the paired transverse arm members 32a and 32a.

Brackets 36 and 36 having a generally L-shaped section are so individually mounted on inner sides of lower end portions of the paired transverse support portions 31a and 31a that their one-side L-shaped portions are directed upward whereas their other-side portions are directed outward. Upward members of the paired transverse brackets 36 and 36 are tapered on their confronting faces to abut against link members 6a, which are transversely disposed on an inner periphery of the crawler 6.

Here, tapered faces of the paired transverse brackets 36 and 36 are held in abutment against the link members 6a thereby to prevent the crawler 6 from being transversely displaced.

Here will be operations and effects of a construction thus far described.

The single track roller units 40a and 40b are disposed at the position closest to the idler 2 and at the position closest to the sprocket 3, respectively, so that the loads to be applied to their track rollers 43 and 47 are borne by the elastic members 44a and 44b, and 48a and 48b disposed over the track rollers 43 and 47. Therefore, distances themselves between the two track rollers 43 and 47 act as effective ground contact lengths.

The two track rollers 43 and 47 are disposed closer to the idler 2 and the sprocket 3, respectively, so that a space in a tumbler distance can be optimized to enlarge the effective ground contact length. This makes it possible to improve a running stability and a tractive force and enables the bulldozer to improve a ground leveling operation with its blade.

High following type double track roller units 10 are adopted at a longitudinally central portion of the drive assembly. As shown in FIG. 2, more specifically, the first arm 31 rocks vertically on the first pin 33 (with a large bogie stroke=L1), and the second arm 32 rocks vertically on the second pin 35 disposed at the distal end portion of the first arm 31 (with a small bogie stroke=L2). As a result, the track rollers 11 and 12 can be given a large bogie stroke (L1+L2), i.e., a sum of the two bogie strokes by rocking motions of the two arms 31 and 32, so that the crawler 6 can have an improved followability to a vertical roughness of the ground. Even if the crawler 6 bends seriously when the drive assembly runs on an undulating portion, the track rollers 11 and 12 can follow the crawler 6 rapidly but do not tend to leave.

Even if the vehicle runs on a rough ground having large undulations, therefore, the track rollers 11 and 12 abut against a tread of the crawler 6, so that the vehicle does not ride on the rough ground. Therefore, it is possible to prevent the crawler 6 from coming out and to improve the riding comfortableness. Moreover, coverage of the undulations by the crawler 6 is increased so that the track rollers 11 and 12 support the vehicle body at all times. Therefore, an impact after the undulations were ridden over can be relaxed to improve durability and the riding comfortableness of the vehicle.

In the embodiment, a rocking fulcrums of the arms 41 and 45 of the single track roller units 40a and 40b and the rocking fulcrums of the first arms 31 of the double track roller units 10 are so arranged closer to the idler than the distal end portions of the arms 41 and 45 and the first arms 31 that only one of the rocking fulcrums may be interposed between the track roller units adjoining each other. Therefore, a distance between the adjoining track roller units is shortened. As a result, the individual track roller distances can be shortened to arrange the track rollers densely within the tumbler distance thereby to provide an excellent running stability.

The elastic members 48a and 48b are mounted between the distal end portion of the first arm 31 of the double track roller unit 10 and the track frame 1, and the paired front and rear track rollers 11 and 12 are attached to the two end portions of the second arm 32, which is attached at its central portion to the distal end portion of the first arm 31. As a result, the loads to be borne by the track rollers 11 and 12 are borne on the elastic members 48a and 48b through the second arm 32 and the first arm 31.

Figure 5:
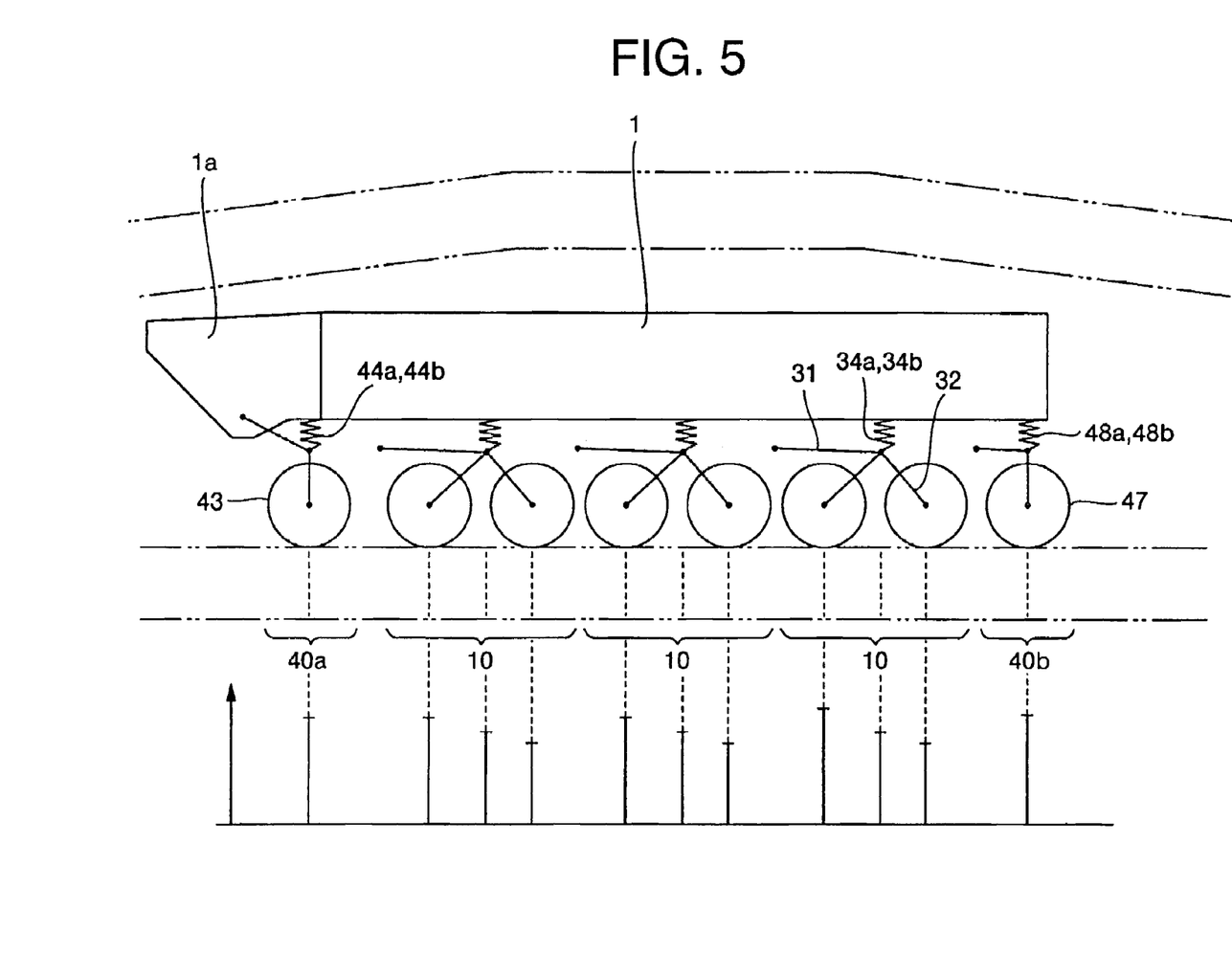
FIG. 5 is a view for explaining the actions of the first embodiment.

As shown in FIG. 5, therefore, the apparent moduli of elasticity of the drive assembly are so differently distributed according to positions, at which the loads are applied to the track rollers 11 and 12, that they are gradually made smaller from the track roller 11 close to the rocking fulcrum (or the pin 33) of the first arm 31 to the distal end portion of the first arm 31 and the more distant track roller 12. An arrow in a lower part of FIG. 5 shows elasticity moduli. The rocking fulcrums of the first arms 31 of the double track roller units 10 having such elasticity modulus distributions are arranged on a same side (i.e., closer to the idler 2 in the embodiment) of the track rollers 11 and 12 of the individual track roller units. Therefore, a distribution of the apparent elasticity moduli is substantially homogenized within the tumbler distance. Therefore, an entire drive assembly hardly rocks vibrationally in a longitudinal direction, when the vehicle runs over the undulations, thereby to improve a running performance.

Figure 6:
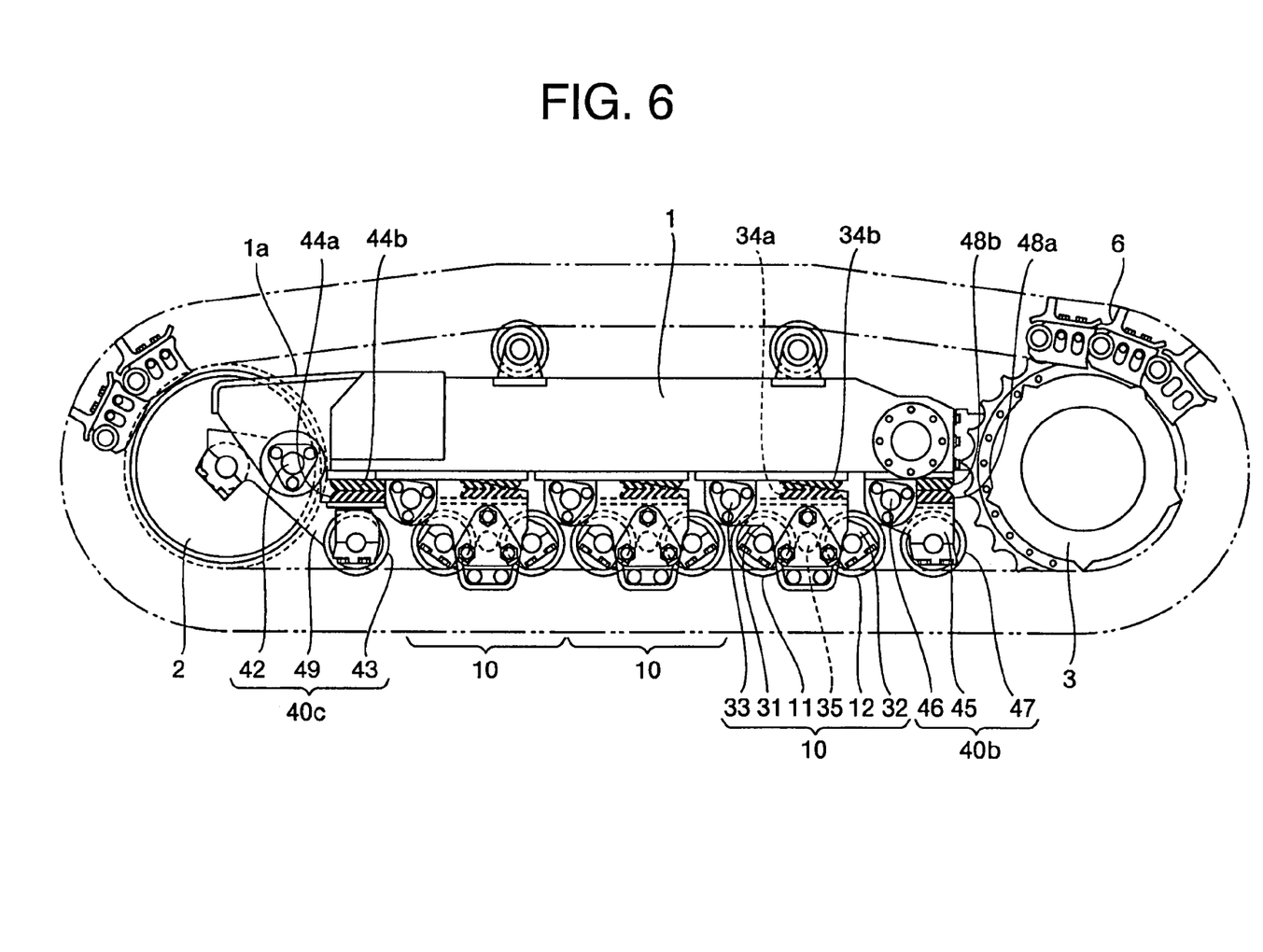
FIG. 6 is a side elevation of a drive assembly according to a second embodiment of the invention.

Next, a second embodiment will be described with reference to FIG. 6. In FIG. 6, a yoke 1a is mounted on one end portion of the track frame 1 and a central portion of an arm 49 in a longitudinal direction is attached to the yoke 1a via the pin 42 so as to vertically rock. The idler 2 is rotatably attached to one end portion of the arm 49, and the track roller 43 is rotatably attached to the other end portion. The elastic members 44a and 44b are mounted on the abutment portion between the other end portion of the arm 49 and the track frame 1.

Here, the arm 49, the track roller 43, the pin 42 and the elastic members 44a and 44b construct a single track roller unit 40c, which rocks vertically in a balance with the idler 2 through the arm 49. Here, remaining structures are similar to those of the first embodiment so that their description is omitted.

The structure of the second embodiment is provided with the single track roller units 40c and 40b at the positions closest to the idler 2 and the sprocket 3 and a predetermined number of double track roller units 10 between the two single track roller units 40c and 40b. As in the first embodiment, therefore, the distances between the two track rollers 43 and 47 of the two single track roller units 40c and 40b act as effective ground contact lengths. The track rollers 43 and 47 are disposed closer to the idler 2 and the sprocket 3, respectively, so that an inter-tumbler space can be optimized to enlarge the effective ground contact length. This makes it possible to improve the running stability and the tractive force.

The single track roller unit 40c has a balance structure which vertically rocks with the pin 42 located at a substantially central portion of the arm 49 as the rocking fulcrum, wherein the idler 2 is mounted on one end portion of the arm 49 and the track roller 43 is mounted on the other end portion of the arm 49. According to this structure, when the idler runs over the undulations during the running time, displacement of the pin 42 becomes smaller than that of the idler 2 thereby to decrease an impact applied to the vehicle body and to reduce a vibration of the vehicle body.

What is claimed is:

1. A drive assembly for a track vehicle having a track frame, an idler and a sprocket arranged substantially on a straight line, a plurality of track rollers disposed rotatably below the track frame, and a crawler made to run around the idler, the track rollers and the sprocket, the drive assembly comprising:

single track roller units disposed at portions closest to the idler and the sprocket respectively, each single track roller unit having an a arm whose proximal end portion is attached to the track frame so as to rock, a track roller rotatably supported at a distal end portion of the arm, and an elastic member disposed between the arm and the track frame in a rotating direction of the arm; and a double track roller unit interposed between the single track roller units having a first arm whose proximal end portion is attached to the track frame so as to rock, a second arm whose central portion is attached to a distal end portion of the first arm, and a pair of front and rear track rollers rotatably supported on both distal ends of the second arm, wherein a pair of track frames is disposed on right and left sides of the track vehicle, each track frame having both the single-track roller units and the double track roller unit, and a vehicle body load is borne via the elastic member.

2. The drive assembly for a track vehicle according to claim 1, wherein an elastic member is disposed between the first arm of the double track roller unit and the track frame in a rocking direction of the first arm of the double track roller unit and the vehicle body load is borne via the elastic member.

3. The drive assembly for a track vehicle according to claim 1, wherein a rocking fulcrum of the arm of the single track roller unit and a rocking fulcrum of the first arm of the double track roller unit are disposed closer to the idler than the distal end portions of the arm of the single track roller unit and the first arm of the double track roller unit.

4. The drive assembly for a track vehicle according to claim 1, wherein the arm of the single track roller unit whose proximal end portion is closest to the idler supports the track roller on one distal end thereof and rotatably supports the idler on another end thereof.

5. The drive assembly for a track vehicle according to claim 3, wherein the arm of the single track roller unit whose proximal end portion is closest to the idler supports the track roller on one distal end thereof and rotatably supports the idler on another end thereof.

6. The drive assembly for a track vehicle according to claim 1, wherein three double track roller units are interposed between the single track roller units.

7. The drive assembly for a track vehicle according to claim 3, wherein three double track roller units are interposed between the single track roller units.

8. The drive assembly for a track vehicle according to claim 4, wherein three double track roller units are interposed between the single track roller units.

9. The drive assembly for a track vehicle according to claim 5, wherein three double track roller units are interposed between the single track roller units.

10. The drive assembly for a track-type vehicle according to claim 2, wherein three double track roller units are interposed between the single track roller unit.

11. The drive assembly for a track vehicle according to claim 2, wherein a rocking fulcrum of the arm of the single track roller unit and a rocking fulcrum of the first arm of the double track roller unit are disposed closer to the idler than the distal end portions of the arm of the single track roller unit and the first arm of the double track roller unit.

12. The drive assembly for a track vehicle according to claim 2, wherein the arm of the single track roller unit whose proximal end portion is closest to the idler supports the track roller on one distal end thereof and rotatably supports the idler on another end thereof.

* * * * *